Jan. 15, 1963  W. M. CLINE ETAL  3,073,628
FITTING
Filed Oct. 13, 1958
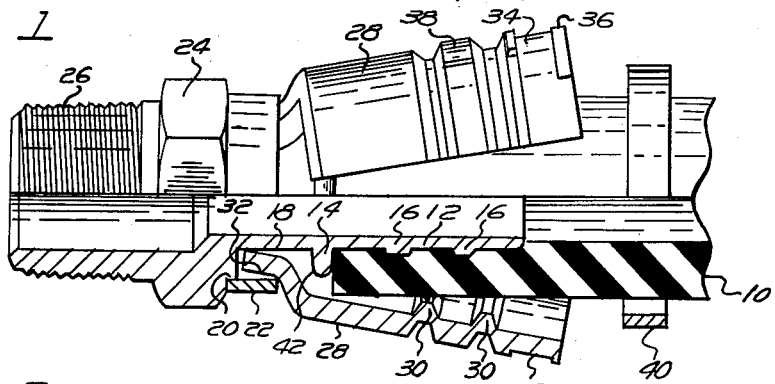
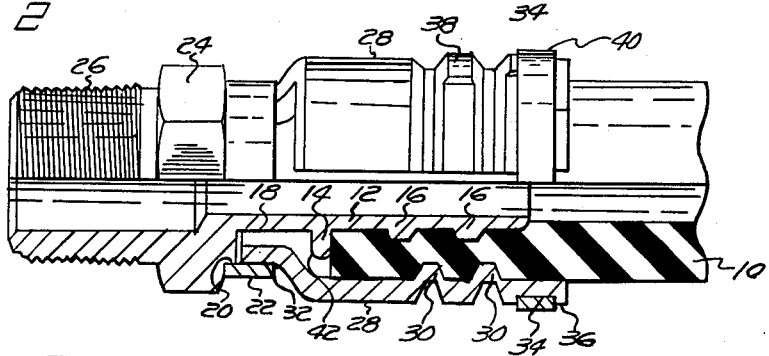
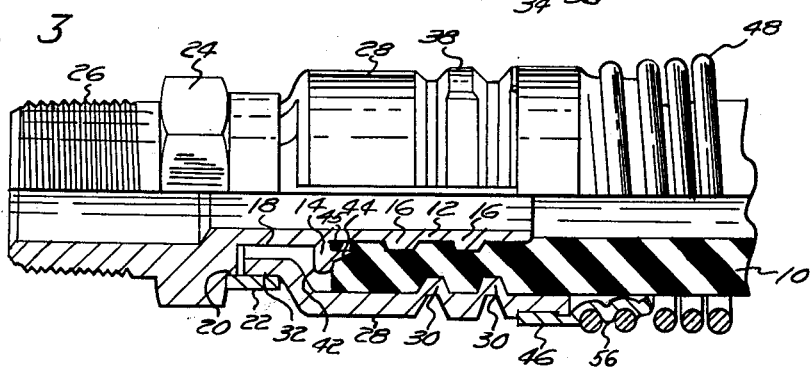
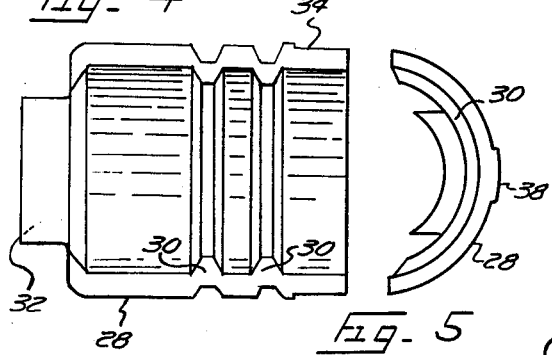
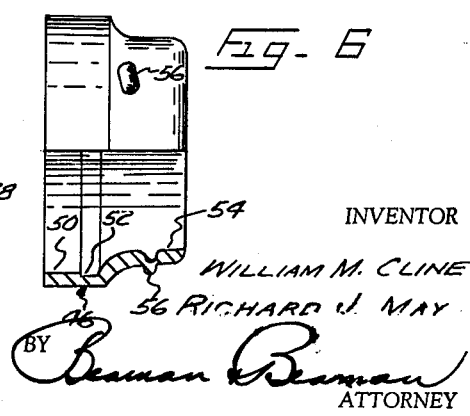
INVENTOR
WILLIAM M. CLINE
RICHARD J. MAY
BY
ATTORNEY United States Patent Office 3,073,628
Patented Jan. 15, 1963

3,073,628
FITTING
William M. Cline, Rives Junction, and Richard J. May, Jackson, Mich., assignors to Aeroquip Corporation, Jackson, Mich., a corporation of Michigan
Filed Oct. 13, 1958, Ser. No. 767,017
1 Claim. (Cl. 285—243)

The present invention relates to fittings for flexible hose and particularly pertains to reusable fittings of the segmented type.

The most effective type of flexible hose fittings has proven to be the type employing an internal sealing nipple to support the hose while being clamped with an external socket and many variations of this construction have been produced. As one of the most important characteristics of a reusable hose fitting lies in its ability to be readily assembled to the hose, a fitting construction requiring a minimum of tools and equipment for assembly is highly desirable.

It is thus an object of the invention to provide a hose fitting which is particularly adapted for use with vacuum or relative low pressure fluid lines as those used with truck braking wherein working pressures up to 125 pounds per square inch are employed and which may be assembled to the hose by the use of only a pair of pliers.

A further object of the invention is to provide a hose fitting for flexible hose which may be removed from the hose by merely using a pair of pliers, yet will not blow off the hose or leak within the designed working pressure ranges.

Another object of the invention is to provide a reusable hose fitting free of transverse projections, of light weight and to which a hose spring guard may be affixed if desired.

A further object of the invention is to provide a segmented reusable hose fitting which may be economically manufactured wherein the socket segments and clamping rings may be formed of stampings, die castings or other inexpensive fabrication method and the other components may be produced of screw machined parts.

These and other objects of the invention will become apparent from the following description and accompanying drawings wherein:

FIG. 1 is a partly sectioned elevational view of a fitting and assembled hose prior to clamping of the segments, FIG. 2 is a view similar to FIG. 1 of the fitting in fully assembled form after the segments have been clamped and the retaining ring placed, FIG. 3 is a partly sectioned elevational view of a modification of the invention showing means for affixing a spring guard to the fitting and employing a lip seal, FIG. 4 is an elevational view of a typical socket segment employed with the invention, FIG. 5 is an end view of the segment of FIG. 4, and FIG. 6 is a partly sectional elevational view of the retaining ring employed for use with a spring guard.

The fitting of the invention may be used with flexible hose of conventional construction, one type of hose being commonly employed for brake use being illustrated in the drawings as a synthetic rubber hose 10 consisting of a rubber inner tube liner covered by two fabric braids which are encompassed by a synthetic rubber outer cover. This type of hose is usually used in braking systems operating at pressures up to 125 p.s.i. and has a minimum bursting pressure of 900 p.s.i. As the hose may be cut with a knife, preparing the hose for the fitting merely consists of squaring the end at the desired length, an operation which can be readily performed by the vehicle operator without special tools.

The fitting includes a tubular nipple 12 having a portion which is of an outer diameter substantially equal to the inner diameter of the hose and is inserted into the hose until the end thereof engages the annular abutment shoulder 14 formed on the nipple. The exterior portion of the nipple is provided with annular ribs 16 which increase the sealing and gripping characteristics of the nipple. These ribs are formed with a front surface, as the nipple is inserted into the hose, which is inclined at 30° to the axis of the nipple to permit the rubber of the hose to ride over the rib without using excessive force. The outer periphery of the ribs is cylindrical, for a distance of .040" with nipples for hoses of ⅜ to ¾ I.D. by way of example, and projects .035" from the surface of the nipple. The back surface is formed at an angle of only 15° to the perpendicular of the nipple axis to provide resistance to removal of the nipple from the hose, yet permits the hose to substantially contact the rib at all the surfaces thereof.

The nipple 12 is recessed at 18, adjacent the abutment shoulder 14, and is formed with an annular shoulder 20 radially spaced from the recess 18 onto which the ring 22 may be placed. It will be noted that the axial width of ring 22 is less than that of the recess 18 whereby access to the annular chamber defined by the ring and recess is provided. The nipple 12 is further formed with the conventional wrench engaging portion 24 and the threads 26 whereby the fitting may be connected to other structure of the fluid system.

The socket of the fitting of the invention consists of segments 28 of cylindrical configuration which are adapted to compress and grip the exterior of the hose in the region supported by the nipple. With smaller diameter hose such as used with brake systems, the socket usually consists of a pair of segments, each encompassing substantially 180° of the hose periphery, however, it is within the scope of the invention to employ three or more segments if such construction is desired. Preferably the segments 30 are formed of stampings or die castings and include interior projecting serrations 30 which are adapted to "bite" into the hose increasing the pressure of the rubber on the nipple in the region of the ribs 16 thereby increasing the sealing and gripping function of the ribs while also maintaining an effective connection between the hose and segments. The serrations 30 project into the hose substantially the same depth, for instance, .075" with a ⅜" I.D. hose, and are formed with sides tapered at 120° to the underside of the segment to facilitate rubber displacement without damage to the hose.

The left or hinge end of the segments 28, as viewed in the drawings, is offset radially inward to define a cylindrical ledge 32 of a diameter which is not greater or less than the base and tip diameters of the serrations 30, thus if the surface of ledge 32 were axially projected toward the serrations it would pass through them. To permit ready assembly of the segment to the nipple it is necessary that the ledge portion of the segment extend through a lesser arc than the serration portion and therefore the segment is fabricated such that the width of the ledge laterally is about one half that of the serration portion, note FIG. 5.

The outer end of the segments are formed with an exterior recess 34 to provide for the retaining ring and each segment is provided with a retaining rim 36 adjacent the end of the segments which extends through 90° of the outer segment surface and maintains the retaining ring in the recess 34. A pliers pad 38 consisting of a small raised portion on the outer surface of the segments centrally located with respect to the arcuate configuration thereof may also be provided to protect the segments and indicate to the operator where the segments are to be gripped during assembly.

The retaining ring 40 in its simplest form is of rectangular cross section and of an inner diameter which will maintain the segments substantially parallel to the nipple and hose axis when assembled as in FIG. 2. It will be appreciated that this ring may take other forms yet perform its basic function of holding the segments in position.

The fitting is assembled as follows:

The hose 10 may be cut to the desired length by using a sharp knife and the ring 40 is then slipped over the severed end. The nipple 12 is then inserted into the hose until the end of hose engages the shoulder 14. When cutting the hose care should be taken that the cut is substantially perpendicular to the hose axis. The segments 28 are now connected to the nipple by arranging the segments on opposite sides of the hose and inserting the ledges 32 under the ring 22. The segments are then folded in against the hose, as in FIG. 1, and by gripping the pads 38 of the opposed segments between the jaws of ordinary hand pliers the segments may be squeezed toward each other, hinging about the ledges 32, until the serrations 30 are pressed into the hose and the two segments substantially define a cylinder. The ring 40 is then slipped over the rims 36 onto recess 34 and the pliers released to complete the assembly.

It will be noted that the serrations 30 are axially positioned in relation to the ribs 16 such that the rubber of the hose is highly pressed to the nipple adjacent the ribs thereby increasing the sealing ability of the nipple and the serrations 30 penetrate deep enough into the hose to prevent blow off of the hose under designed pressures. Referring to FIG. 2, it will be observed that when the fitting is assembled the maximum diameter of the abutment shoulder 14 is greater than the minimum diameter formed by the inner surfaces of the ledges 32, thus should pressure surges cause the nipple to axially move to the left the shoulder 14 will engage the ledges 32 at 42 and further axial nipple movement would not take place unless the pressure was sufficient to axially translate the segments. Such movement would not occur unless the designed operating pressures were exceeded by several times.

Disassembly of the fitting and hose is the opposite procedure to that described above. After the fitting has been in use for some time the union with the nipple may be very tight and removal may be facilitated by slitting the hose longitudinally in the nipple region after removal of the segments.

A modification of fitting similar to that described above is illustrated in FIG. 3 wherein similar members to those described are designated by identical reference numerals. The fitting of FIG. 3 is the same as FIG. 1 except that a lip seal 44 has been incorporated on the abutment shoulder 14. The principle of lip seal sealing is set forth in the assignees Patent No. 2,731,279, filed September 14, 1950, and the operation of the lip of the instant invention is similar to that of the aforementioned patent. The lip 44 consists of an annular, axially extending projection provided with a sharp edge and formed integral with the shoulder 14. The inner surface of the lip is substantially parallel with the adjacent nipple surface and is radially spaced therefrom such that as the hose is inserted on the nipple the lip 44 will cut the hose to form a flap portion 45 intermediate the lip seal 44 and the nipple. Thus, fluid escaping between the nipple and the hose will force the flap 45 into tight sealing engagement with the underside of the lip seal preventing fluid from escaping around the lip seal. It will be appreciated that the lip seal 44 may be formed as a separate element rather than integral with the shoulder 14.

FIGS. 3 and 6 also illustrate another form of clamping or retaining ring 46 which may be used to retain the segments 28 in contracted position and also serves as a support for a spring guard 48. The ring 46 is preferably formed from a stamping and is provided with a cylindrical end portion 50 which is recessed at 52 whereby the ring will fit into recess 34 and have clearance for the retaining rim 36. The ring is reduced in diameter at 54 and is provided with several, at least three, exterior projections or lugs 56 which are helically disposed on the surface 54 such that the spring guard may be screwed onto the ring 46. Thus an economical and easily assembled means are provided for affixing a spring guard to the fitting of the invention.

We claim:

In a detachable, resusable end fitting for use with flexible hose comprising a tubular nipple having a cylindrical portion insertable into the end of the hose, an annular radially extending shoulder formed on the nipple engageable by the end of the hose, fitting connection means formed on said nipple, a recess defined on said nipple intermediate said shoulder and connection means, an annular axial extending surface defined on said nipple having a diameter greater than that of said recess, a fulcrum ring mounted at one end on said axial extending surface having a cylindrical inner surface concentric to the nipple axis, said ring axially extending toward and terminating short of said annular shoulder and radially spaced from said recess whereby said recess, shoulder and ring define an annular chamber accessible through an annular opening defined by the non-supported ring end and said shoulder, a socket having inner cylindrical surfaces adapted to substantially encompass the hose in the region of the nipple, said socket collectively comprising a plurality of segments having a cylindrical hose engaging portion and a cylindrical fulcrum ring engaging end portion and a retaining ring receiving end portion defined at opposite ends of said segments, said fulcrum end portion being inserted through said opening for engagement with the underside of said fulcrum ring, the configuration of the underside of said fulcrum ring being complementary to that of the segment fulcrum portion and a retaining ring engaging the ring receiving end portion of said segments maintaining said segments in hose compressing relation to said hose, said retaining ring including an axially extending portion supporting radial projections defined in a helical relation on said portion whereby a spring guard may be affixed to said retaining ring.

References Cited in the file of this patent

UNITED STATES PATENTS

| 409,066 | Ravenel | Aug. 13, 1889 |
| 880,060 | Wood | Feb. 25, 1908 |
| 1,113,080 | Wilson | Oct. 6, 1914 |
| 2,166,448 | Schuknecht | July 18, 1939 |
| 2,280,892 | Cowles | Apr. 28, 1942 |
| 2,463,283 | Mentel | Mar. 1, 1949 |
| 2,731,279 | Main | Jan. 17, 1956 |